US009482933B2

(12) United States Patent
Chuang et al.

(10) Patent No.: US 9,482,933 B2
(45) Date of Patent: Nov. 1, 2016

(54) PROJECTION APPARATUS AND METHOD FOR PROTECTING PROJECTION APPARATUS BY SENSING LIGHT INTENSITIES

(71) Applicants: Ching-Sheng Chuang, Hsin-Chu (TW); Hsu-Chuan Chen, Hsin-Chu (TW); Pei-Lun Yu, Hsin-Chu (TW)

(72) Inventors: Ching-Sheng Chuang, Hsin-Chu (TW); Hsu-Chuan Chen, Hsin-Chu (TW); Pei-Lun Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 14 days.

(21) Appl. No.: 14/622,922

(22) Filed: Feb. 16, 2015

(65) Prior Publication Data

US 2015/0331303 A1 Nov. 19, 2015

(30) Foreign Application Priority Data

May 16, 2014 (CN) .......................... 2014 1 0208656

(51) Int. Cl.
*G03B 21/20* (2006.01)
*G03B 21/14* (2006.01)
*G03B 33/06* (2006.01)

(52) U.S. Cl.
CPC ........... *G03B 21/14* (2013.01); *G03B 21/2053* (2013.01); *G03B 33/06* (2013.01)

(58) Field of Classification Search
CPC ............................... G03B 21/14; G03B 21/20
See application file for complete search history.

(56) References Cited

U.S. PATENT DOCUMENTS

| 7,760,173 B2 | 7/2010 | Iwanaga | |
|---|---|---|---|
| 7,942,534 B2 | 5/2011 | Miyazawa | |
| 2008/0013057 A1* | 1/2008 | Bullock | G09G 3/002 353/121 |
| 2009/0034284 A1* | 2/2009 | Li | G03B 33/06 362/554 |
| 2011/0043764 A1* | 2/2011 | Narikawa | G03B 21/204 353/31 |
| 2013/0003026 A1 | 1/2013 | Rothaar | |

FOREIGN PATENT DOCUMENTS

| CN | 102279510 | 12/2011 |
|---|---|---|
| CN | 102385227 | 3/2012 |
| CN | 102520569 | 6/2012 |
| CN | 103676425 | 3/2014 |

OTHER PUBLICATIONS

Office Action of China Counterpart Application, issued on Jun. 13, 2016, p. 1-p. 9.

* cited by examiner

*Primary Examiner* — Sultan Chowdhury
*Assistant Examiner* — Danell L Owens
(74) *Attorney, Agent, or Firm* — Jianq Chyun IP Office

(57) ABSTRACT

A projection apparatus and a method for protecting the projection apparatus are provided. The projection apparatus includes a light source module, a light source control module, and an optical engine module. The light source module includes a light source and light conversion unit. The light source emits an illumination beam, and the light conversion unit converts the illumination beam into a plurality of color beams with different colors. The light source control module includes a light sensing unit and a control unit. The light sensing unit senses light intensities of the color beams, and the control unit determines whether to turn off the light source according to at least one of a light intensity proportion of the color beams and a sum of the light intensities of the color beams. The optical engine module receives the color beams to generate an image beam.

7 Claims, 5 Drawing Sheets

PROJECTION APPARATUS AND METHOD FOR PROTECTING PROJECTION APPARATUS BY SENSING LIGHT INTENSITIES

CROSS-REFERENCE TO RELATED APPLICATION

This application claims the priority benefit of China application serial no. 201410208656.2, filed on May 16, 2014. The entirety of the above-mentioned patent application is hereby incorporated by reference herein and made a part of this specification.

BACKGROUND

1. Technical Field

The invention relates to a display technique, and particularly relates to a projection apparatus and a method for protecting the projection apparatus.

2. Related Art

A projector is a display device used for producing large size images. An imaging principle of the projector is to convert an illumination beam generated by a light source module into an image beam through a light valve, and project the image beam onto a screen or a wall through a lens to form an image.

However, when operation of internal components of the projector is abnormal, the projector is damaged. U.S. Pat. No. 7,760,173 and U.S. Pat. No. 7,942,534 disclose related techniques for determining and handling the abnormal operation of the internal components of the projector.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

Accordingly, the invention is directed to a projection apparatus and a method for protecting the projection apparatus capable of avoiding damage expansion of the projection apparatus.

Other objects and advantages of the invention can be further illustrated by the technical features broadly embodied and described as follows.

In order to achieve one or a portion of or all of the objects or other objects, an embodiment of the invention provides a projection apparatus including a light source module, a light source control module, and an optical engine module. The light source module includes a light source and light conversion unit. The light source emits an illumination beam, and the light conversion unit converts the illumination beam into a plurality of color beams with different colors. The light source control module includes a light sensing unit and a control unit. The light sensing unit senses light intensities of the color beams, and the control unit determines whether to turn off the light source according to at least one of a light intensity proportion of the color beams and a sum of the light intensities of the color beams. Moreover, the optical engine module receives the color beams to generate an image beam.

In an embodiment of the invention, the control unit selects one of the color beams to serve as a reference color beam, calculates a plurality of light intensity ratios between the color beams with the other colors and the reference color beam, and turns off the light source when any one of the light intensity ratios exceeding a predetermined ratio range is determined.

In an embodiment of the invention, the control unit turns off the light source when the sum of the light intensities of the color beams exceeding a predetermined light intensity range is determined.

In an embodiment of the invention, the illumination beam is an excitation beam, and the light conversion unit includes a fluorescent wheel and a filter color wheel. The fluorescent wheel receives and converts the excitation beam, and the filter color wheel receives and converts the excitation beam converted by the fluorescent wheel into the color beams.

In an embodiment of the invention, the illumination beam is an excitation beam, and the light conversion unit includes at least one fluorescent wheel, and the fluorescent wheel receives and converts the excitation beam into the color beams.

In an embodiment of the invention, the optical engine module includes a light valve, and the light sensing unit is disposed on an optical path between the light valve and the light conversion unit.

An embodiment of the invention provides a method for protecting a projection apparatus, which includes following steps. An illumination beam is converted into a plurality of color beams with different colors. Light intensities of the color beams are sensed. It is determined whether to turn off a light source emitting the illumination beam according to at least one of a light intensity proportion of the color beams and a sum of the light intensities of the color beams.

In an embodiment of the invention, the step of determining whether to turn off the light source according to the light intensity proportion of the color beams includes following steps. One of the color beams is selected as a reference color beam. A plurality of light intensity ratios between the color beams with the other colors and the reference color beam are calculated. It is determined whether any one of the light intensity ratios exceeds a predetermined ratio range. The light source is turned off when any one of the light intensity ratios exceeds the predetermined ratio range.

In an embodiment of the invention, the step of determining whether to turn off the light source according to the sum of the light intensities of the color beams includes following steps. It is determined whether the sum of the light intensities of the color beams exceeds a predetermined light intensity range. The light source is turned off when the sum of the light intensities of the color beams exceeds the predetermined light intensity range.

According to the above descriptions, in the embodiments of the invention, it is determined whether to turn off the light source of the projection apparatus according to at least one of the light intensity proportion of the color beams and the sum of the light intensities of the color beams. In the embodiments of the invention, the color beams are converted by the light conversion unit of the light source module, it is determined whether to turn off the light source by sensing the light intensities of the color beams through the light sensing unit of the light source control module and obtaining the light intensity proportion and/or the sum of the light intensities of the color beams through the control unit of the light source control module, so as to avoid damage expansion of the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
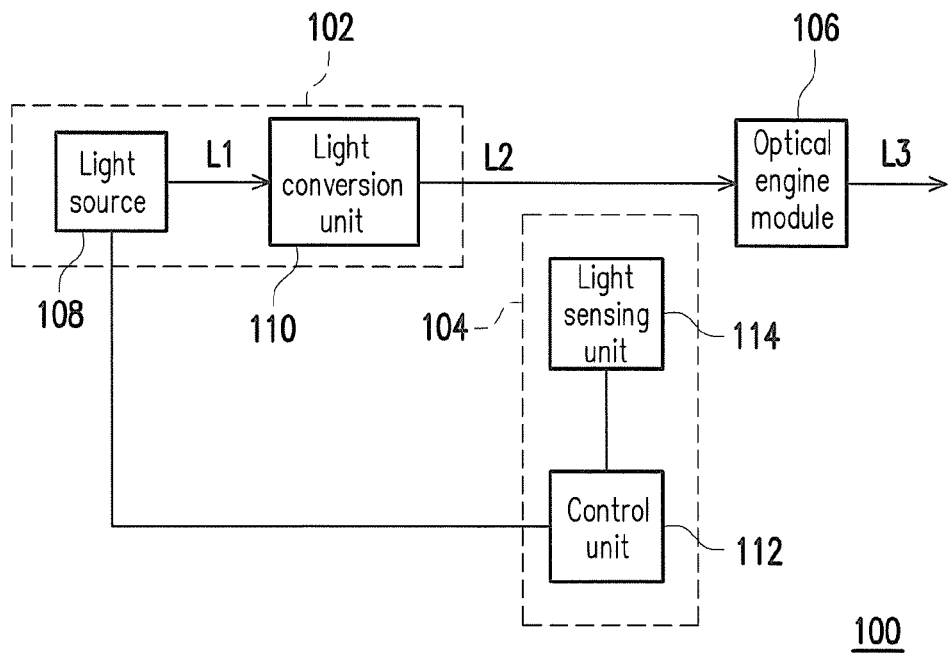
FIG. 1A is a schematic diagram of a projection apparatus according to an embodiment of the invention.

Referring to FIG. 1A, the projection apparatus 100 includes a light source module 102, a light source control module 104, and an optical engine module 106. The light source module 102 is coupled to the light source control module 104. The light source module 102 includes a light source 108 and a light conversion unit 110, and the light source 108 provides an excitation beam, for example, the light source 108 may be a laser diode or a light-emitting diode (LED), though the invention is not limited thereto. The light source module 102 emits a plurality of color beams L2 with different colors. The optical engine module 106 receives the color beams L2 from the light source module 102, and converts the color beams L2 into an image beam L3. In the embodiment, the light source control module 104 senses light intensities of the color beams L2, an determines whether to disable the light source module 102 according to at least one of a light intensity proportion of the color beams L2 and a sum of the light intensities of the color beams L2, so as to avoid damage expansion of the projection apparatus 100 when the light source module 102 is abnormal.

Figure 1B:
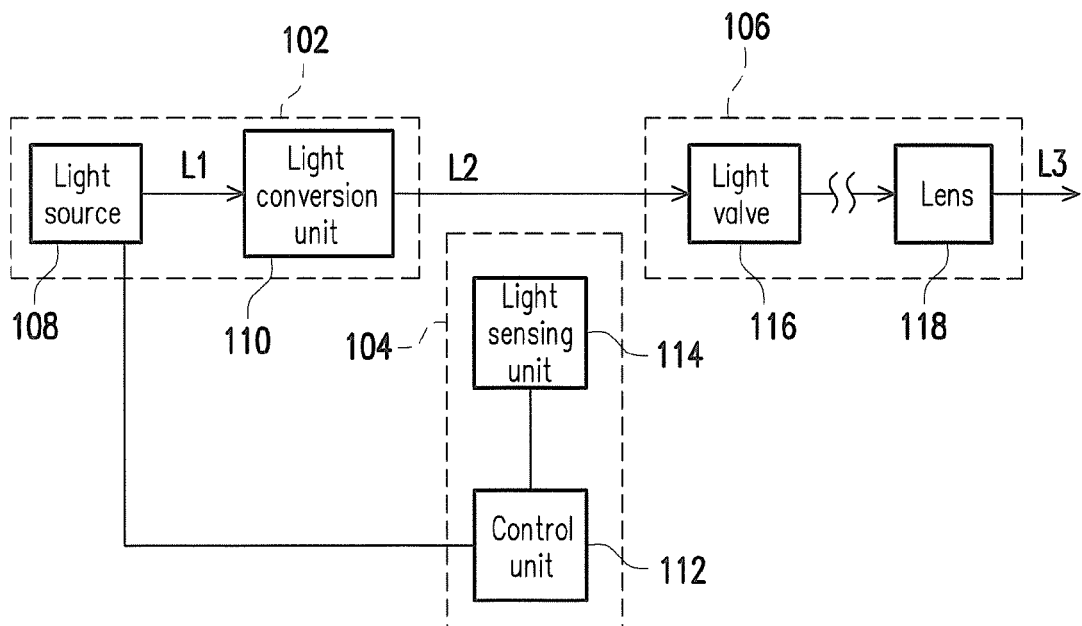
FIG. 1B is a schematic diagram of another projection apparatus according to an embodiment of the invention.

In another embodiment, as shown in FIG. 1B, the projection apparatus 100' includes the light source module 102, the light source control module 104, and the optical engine module 106. The optical engine module 106 includes a light valve 116 and a lens 118. The light valve 116 may be, for example, a digital micro-mirror device (DMD), a liquid-crystal-on-silicon (LCOS) panel or a liquid crystal display (LCD), which is not limited by the invention.

Figure 2:
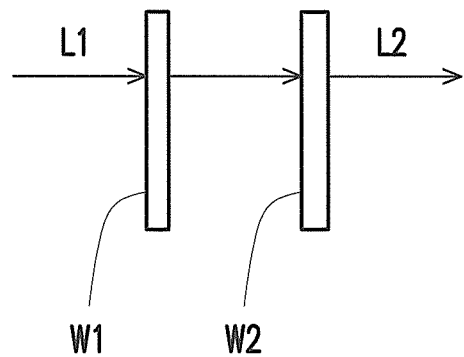
FIG. 2 is a schematic diagram of a light conversion unit according to an embodiment of the invention.

In the embodiment, the light source module 102 includes a light source 108 and a light conversion unit 110. The light source 108 emits an illumination beam L1 to the light conversion unit 110. The illumination beam L1 may be, for example, an excitation beam, and the light source 108 may be, for example, implemented by a laser diode, though the invention is not limited thereto. The light conversion unit 110 converts the illumination beam L1 into a plurality of color beams L2 with different colors, for example, color beams with a red color, a blue color, a yellow color, a green color, etc. In the embodiment, the light conversion unit 110 may be, for example, composed of a fluorescent wheel W1 and a filter color wheel W2 shown in FIG. 2. However, if only the fluorescent wheel W1 is configured, the effect of converting the color beams L2 with different colors is achieved. Besides, after the fluorescent wheel W1 is excited by the excitation beam provided by the light source 108, the fluorescent wheel W1 converts the excitation beam into the color beams. In another embodiment, the fluorescent wheel W1 has a transparent area for the excitation beam passing through. The filter color wheel W2 further converts the converted color beam or the excitation beam into the color beams L2. It should be noticed that a color saturation of each color of the color beams L2 passing through the fluorescent wheel W1 and the filter color wheel W2 is increased. In some embodiments, the light conversion unit 110 may only include one or a plurality of fluorescent wheels W1 and not include the filter color wheel W2, or the light conversion unit 110 may only include one or a plurality of filter color wheels W2 and not include the fluorescent wheel W1, which is determined according to an actual design and not limited by the invention. For example, the fluorescent wheel(s) W1 may be excited to produce the color beams L2 with different colors through fluorescent agents with different colors being coated on the fluorescent wheel(s) W1, or each of a plurality of fluorescent wheels W1 being coated with the fluorescent agent having one color may be used so as to excite the color beams L2 having different colors, or excitation beams having different frequencies may be used to excite one wheel W1 or a plurality of fluorescent wheels W1 to determine the color of the color beams L2.

Figure 3:
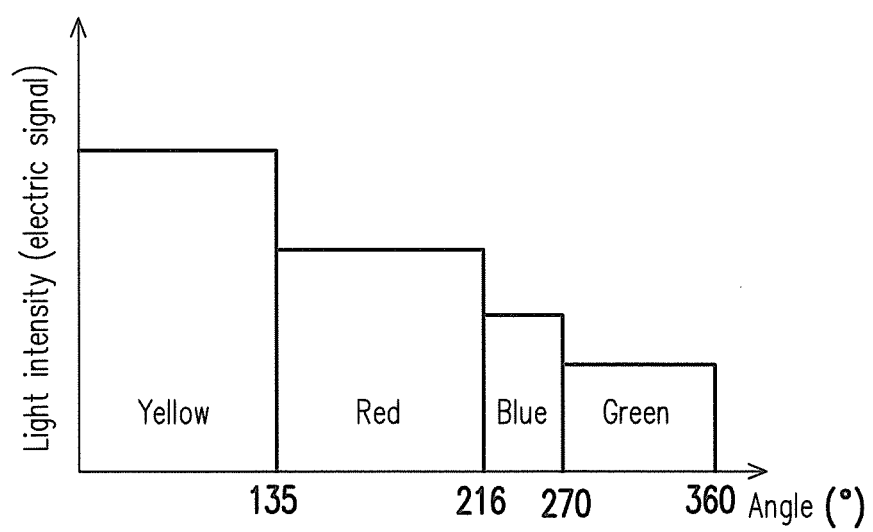
FIG. 3 is a schematic diagram of light intensities of color beams output by the light conversion unit according to an embodiment of the invention.

Moreover, the light source control module 104 of the embodiment, for example, includes a control unit 112 and a light sensing unit 114. The light sensing unit 114 may be, for example, a photo diode. The control unit 112 is coupled to the light source 108 and the light sensing unit 114. The light sensing unit 114 is disposed on an optical path between the light valve 116 and the light conversion unit 110 for sensing light intensities of the color beams L2 with different colors produced by the light source module 102, and configured for converting the light intensities of the color beams L2 into electric signals (for example, voltage or current). The control unit 112 receives the electric signals produced by the light sensing unit 114 to obtain light intensity information of the color beams L2, and the light intensity information may be a light intensity proportion of the color beams L2 and/or a sum of the light intensities of the color beams L2. In this way, the control unit 112 may determine whether to turn off the light source 108 according to at least one of the light intensity proportion of the color beams L2 and the sum of the light intensities of the color beams L2 corresponding to the light intensity information. FIG. 3 is an example, and the light conversion unit 110 converts the illumination beam L1 into the color beams L2 with four colors of a yellow color, a red color, a blue color, and a green color in the embodiment. As shown in FIG. 3, the light intensity and an output time length of each of color beams L2 may be different. Besides, in FIG. 3, a horizontal axis represents proportions of areas on the wheel capable of exciting the color beams L2 with different colors; wherein the greater the angle corresponding to the color is, the longer the time for converting and outputting the corresponding color beam of the color beams L2 is (for example, the angle corresponding to the yellow color is 135° and the angle corresponding to the blue color is 54°, so that the time for converting and outputting the yellow color light is longer than the time for converting and outputting the blue color light).

According to the above descriptions, the determination/judge basis for determining whether to turn off the light source 108 by the control unit 112 is described below. In the embodiment, the color beam with one certain color of the color beams L2 is selected to serve as a reference color beam, and a plurality of light intensity ratios between the color beams with the other colors rather than the certain color of the color beams L2 and the reference color beam are calculated, so as to determine whether the light intensity of the color beam with a specific color is abnormal. For example, the yellow color beam is taken as the reference color beam, and it is determined whether the light intensity ratios between the color beams with the other colors and the yellow color beam are within a predetermined ratio range (the predetermined ratio ranges corresponding to different colors may be the same or different). If the light intensity ratio between the color beam with any color rather than the yellow color and the yellow color beam is too large (for example, the light intensity ratio of the non-yellow color to the yellow color is higher than a first default value) or too small (for example, the light intensity ratio of the non-yellow color to the yellow color is lower than a second default value, wherein the first default value is greater than the second default value) to exceed the predetermined ratio range(s), it represents that a certain area of a wheel corresponding to a certain color is damaged and the control unit 112 may turn off the light source 108 at this time to avoid further damage of the wheel or the other components in the projection apparatus. On the other hand, volatilization of toxic substances due to damage of the wheel is avoided, so as to improve usage security of the projection apparatus.

According to the above description, it is known that the control unit 112 determines whether to turn off the light source 108 by determining whether the light intensity ratios between the color beams with the other colors and the yellow color beam exceed the predetermined ratio range(s). Moreover, in other embodiments, the control unit 112 may also determine whether to turn off the light source 108 according to the sum of the light intensities of all kinds of colors of the color beams L2 sensed by the sensing unit 114. In detail, when the sum of the light intensities of all kinds of colors of the color beams L2 exceeds the predetermined light intensity range (for example, the sum of the light intensities is higher than or lower than a default value), the control unit 112 turns off the light source 108. In this way, damage of the wheel or other components in the projection apparatus is avoided.

Figure 4:
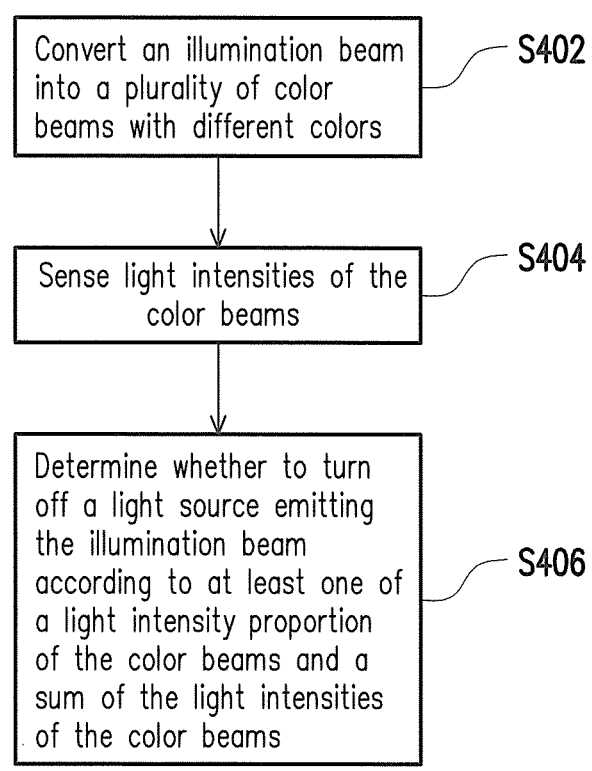
FIGS. 4-6 are flowcharts illustrating methods for protecting a projection apparatus according to three embodiments of the invention.

Referring to FIG. 4, the method for protecting the projection apparatus includes following steps. First, an illumination beam is converted into a plurality of color beams with different colors (step S402). Then, light intensities of the color beams are sensed (step s404). Thereafter, it is determined whether to turn off a light source emitting the illumination beam according to at least one of a light intensity proportion of the color beams and a sum of the light intensities of the color beams (step S406).

Figure 5:
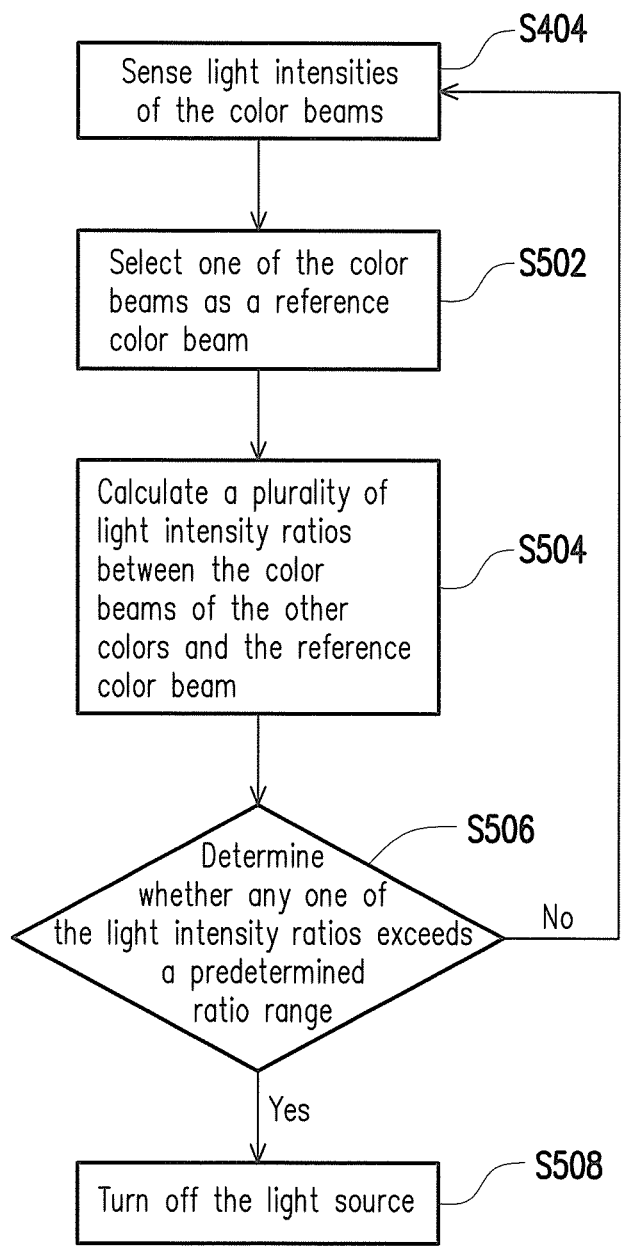

In an embodiment, the step of determining whether to turn off the light source according to the light intensity proportion of the color beams includes steps shown in FIG. 5. First, one of the color beams is selected as a reference color beam (step S502). Then, a plurality of light intensity ratios between the color beams with the other colors and the reference color beam are calculated (step S504). Thereafter, it is determined whether any one of the light intensity ratios exceeds a predetermined ratio range (step S506). If any one of the light intensity ratios exceeds the predetermined ratio range, the light source is turned off (step S508), so as to avoid damage expansion of the projection apparatus. Conversely, if none of the light intensity ratios exceeds the predetermined ratio range, the light intensities of the color beams are re-sensed continuously (step S404).

Figure 6:
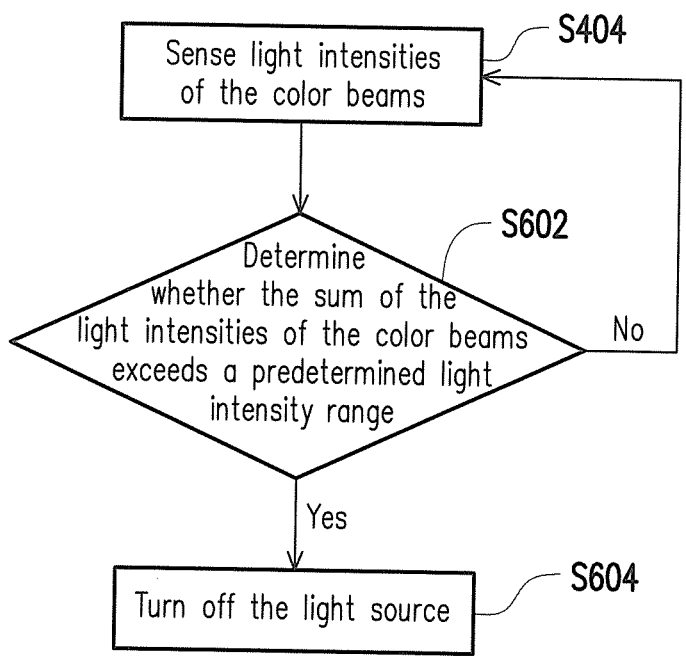

However, in other embodiments, the step of determining whether to turn off the light source according to the sum of the light intensities of the color beams includes steps shown in FIG. 6. First, it is determined whether the sum of the light intensities of the color beams exceeds a predetermined light intensity range (step S602). If the sum of the light intensities of the color beams exceeds the predetermined light intensity range, the light source is turned off (step S604) to avoid damaging the projection apparatus. Conversely, if the sum of the light intensities of the color beams does not exceed the predetermined light intensity range, the light intensities of the color beams are re-sensed continuously (step S404).

In some embodiments, the light intensity proportion of the color beams and the sum of the light intensities of the color beams may be simultaneously considered to determine whether to turn off the light source. For example, if it is determined that the sum of the light intensities of the color beams does not exceed the predetermined light intensity range in the step S602 of FIG. 6, the step S502 to the step S506 of FIG. 5 may be executed to further determine whether any one of the light intensity ratios (the light intensity proportion of the color beams) exceeds the predetermined ratio range, so as to determine whether to turn off the light source. Similarly, in other embodiments, when the light intensity proportion of the color beams and the sum of the light intensities of the color beams are simultaneously considered to determine whether to turn off the light source, if it is determined that none of the light intensity ratios exceeds the predetermined ratio range in the step S506 of FIG. 5, the step S602 may be executed to further determine whether the sum of the light intensities of the color beams exceeds the predetermined light intensity range, so as to determine whether to turn off the light source.

In summary, in the embodiments of the invention, it is determined whether to turn off the light source of the projection apparatus according to at least one of the light intensity proportion of the color beams and the sum of the light intensities of the color beams. In the embodiments of the invention, the color beams are converted by the light conversion unit of the light source module, it is determined whether to turn off the light source by sensing the light intensities of the color beams through the light sensing unit of the light source control module and obtaining the light intensity proportion and/or the sum of the light intensities of the color beams through the control unit of the light source control module, so as to avoid damage expansion of the projection apparatus and improve usage security of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    a light source module, comprising:
        a light source, emitting an illumination beam; and
        a light conversion unit, converting the illumination beam into a plurality of color beams with different colors;
    a light source control module, comprising:
        a light sensing unit, sensing light intensities of the color beams; and
        a control unit, determining whether to turn off the light source according to at least one of a light intensity proportion of the color beams and a sum of the light intensities of the color beams; and
    an optical engine module, receiving the color beams to generate an image beam,
    wherein the control unit selects one of the color beams as a reference color beam, calculates a plurality of light intensity ratios between the color beams with the other colors and the reference color beam, and turns off the light source when any one of the light intensity ratios exceeding a predetermined ratio range is determined.

2. The projection apparatus as claimed in claim 1, wherein the control unit turns off the light source when the sum of the light intensities of the color beams exceeding a predetermined light intensity range is determined.

3. The projection apparatus as claimed in claim 1, wherein the illumination beam is an excitation beam, and the light conversion unit comprises:
    a fluorescent wheel, receiving and converting the excitation beam; and
    a filter color wheel, receiving and converting the excitation beam converted by the fluorescent wheel into the color beams.

4. The projection apparatus as claimed in claim 1, wherein the illumination beam is an excitation beam, and the light conversion unit comprises:
    at least one fluorescent wheel, receiving and converting the excitation beam into the color beams.

5. The projection apparatus as claimed in claim 1, wherein the optical engine module comprises a light valve, and the light sensing unit is disposed on an optical path between the light valve and the light conversion unit.

6. A method for protecting a projection apparatus, comprising:
    converting an illumination beam into a plurality of color beams with different colors;
    sensing light intensities of the color beams; and
    determining whether to turn off a light source emitting the illumination beam according to at least one of a light intensity proportion of the color beams and a sum of the light intensities of the color beams,
    wherein the step of determining whether to turn off the light source according to the light intensity proportion of the color beams comprises:
        selecting one of the color beams as a reference color beam;
        calculating a plurality of light intensity ratios between the color beams with the other colors and the reference color beam;
        determining whether any one of the light intensity ratios exceeds a predetermined ratio range; and
        turning off the light source when any one of the light intensity ratios exceeds the predetermined ratio range.

7. The method for protecting the projection apparatus as claimed in claim 6, wherein the step of determining whether to turn off the light source according to the sum of the light intensities of the color beams comprises:
    determining whether the sum of the light intensities of the color beams exceeds a predetermined light intensity range; and
    turning off the light source when the sum of the light intensities of the color beams exceeds the predetermined light intensity range.

* * * * *